Aug. 2, 1927.

J. L. AMARGOS 1,637,926

STALK CUTTING ATTACHMENT FOR PLOWS

Filed July 30, 1926

José L. Amargos
INVENTOR

BY Victor J. Evans
ATTORNEY

WITNESS:

Patented Aug. 2, 1927.

1,637,926

UNITED STATES PATENT OFFICE.

JOSÉ LORENZO AMARGÓS, OF SAN MANUEL, CUBA.

STALK-CUTTING ATTACHMENT FOR PLOWS.

Application filed July 30, 1926. Serial No. 126,076.

This invention relates to an attachment for a plow, the general object of the invention being to provide a cutting disk and runners for carrying the same, with means for so attaching the runners to the plow beam that fodder and other trash will be pressed upon the ground in front of the plow by the runners so that the cutter can cut the same and thus permit the cut portions to be turned under by the plow.

Another object of the invention is to provide a flexible arm for pushing to one side the matter cut by the disks so that this cut matter will be more readily covered by the soil turned over by the plow.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
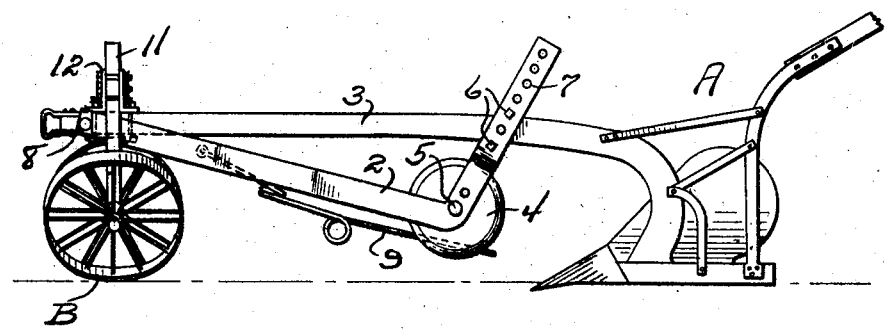
Figure 1 is a side view showing the device applied to a plow.
Figure 2:
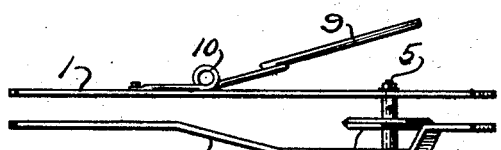
Figure 2 is a plan view of the device itself.

In these views, 1 and 2 indicate a pair of members of substantially L-shape, the member 1 being flat in a vertical plane, while the member 2 has its central portion offset adjacent its center or adjacent the junction of one arm with the other. These members are spaced apart to receive the beam 3 of a plow A between them and also to afford space for a cutter disk 4, the shaft 5 of which is arranged at the junction of the two arms of each member. The rear portion of the device is fastened to the beam by the bolts 6 which pass through any one of a plurality of pairs of holes 7 in the two members. The front end of the device is pivoted to the front end of the beam, as shown at 8. By means of the plurality of holes 7, the device can be adjusted on the plow to space the cutter disk any desired distance from the ground.

An arm 9, formed with the loops 10 to make it flexible, is fastened to the member 1 and said arm extends outwardly and rearwardly from said member 1.

As the plow is pulled along, either by horse or a tractor, the front portions of the members 1 and 2 will press straw, cane or any other matter lying on the ground, against the ground and then as the disk 4 engages this material, it will cut it so that it can be turned under by the plow. The arm 9 acts to move the material cut by the disk to one side so that it will be more readily turned under by the plow.

Figure 4:
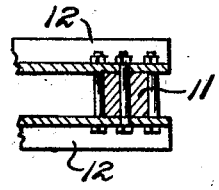
Figure 4 is a section on line 4—4 of Figure 3.
Figure 3:
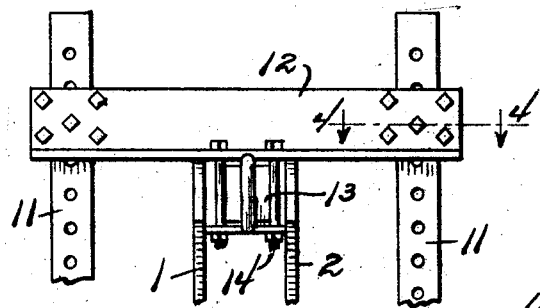
Figure 3 is a front view of the upper portion of a truck for supporting the front end of the beam of the plow.

In order to improve the operation of the device on a plow, such as shown in Figure 1, I provide a truck B for the front end of the beam. The wheels of this truck are supported by the frame, which includes the upright bars 11 having their upper ends connected together by the cross pieces 12, these pieces being of angle shape and being connected to the beam by the bolts 13 which pass through the plate 14 at the bottom edge of the beam. As shown in Figures 3 and 4, the cross pieces are adjustably connected with the uprights 11.

Of course, the device can be used on sulky plows and other plows with but little change to the parts.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

An attachment for a plow comprising a pair of L-shaped members adapted to have their front ends connected with the front end of the beam of the plow, means for adjustably connecting the short arms of the members with the beam in front of the curved portion thereof, a cutter disk placed between the members and supported from the same at the junction of the short arms with the long arms of the members and an arm, formed with loops to make it flexible, fastened to one member and extending outwardly and rearwardly from said member.

In testimony whereof I affix my signature.

JOSÉ LORENZO AMARGÓS.